United States Patent
Wada et al.

(10) Patent No.: US 10,112,864 B2
(45) Date of Patent: *Oct. 30, 2018

(54) GLASS ARTICLE AND LIGHT GUIDE

(71) Applicant: ASAHI GLASS COMPANY, LIMITED, Chiyoda-ku (JP)

(72) Inventors: Naoya Wada, Chiyoda-ku (JP); Yusuke Arai, Chiyoda-ku (JP); Hiroyuki Hijiya, Chiyoda-ku (JP); Yuki Kondo, Chiyoda-ku (JP)

(73) Assignee: AGC Inc., Chiyoda-ku (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/800,311

(22) Filed: Nov. 1, 2017

(65) Prior Publication Data

US 2018/0050954 A1  Feb. 22, 2018

Related U.S. Application Data (63) Continuation of application No. 15/671,519, filed on Aug. 8, 2017, which is a continuation of application No. PCT/JP2016/057618, filed on Mar. 10, 2016.

(30) Foreign Application Priority Data

Mar. 16, 2015 (JP) ................................ 2015-052217

(51) Int. Cl.
| | | |
|---|---|---|
| *C03C 3/087* | (2006.01) | |
| *C03C 4/00* | (2006.01) | |
| *C03C 3/083* | (2006.01) | |
| *G02B 1/00* | (2006.01) | |
| *C03C 3/095* | (2006.01) | |
| *C03C 3/085* | (2006.01) | |
| *F21V 8/00* | (2006.01) | |

(52) U.S. Cl.
CPC ............ *C03C 4/0092* (2013.01); *C03C 3/083* (2013.01); *C03C 3/085* (2013.01); *C03C 3/087* (2013.01); *C03C 3/095* (2013.01); *G02B 1/00* (2013.01); *G02B 6/0011* (2013.01)

(58) Field of Classification Search
CPC ......... C03C 3/087; C03C 3/085; C03C 3/083; C03C 4/0092; F21S 2/00; G02B 1/046; G02B 1/00; G02B 1/045; G02B 1/048
See application file for complete search history.

(56) References Cited

U.S. PATENT DOCUMENTS

| | | |
|---|---|---|
| 2012/0302423 A1 | 11/2012 | Kinoshita et al. |
| 2013/0105722 A1 | 5/2013 | Tsuzuki et al. |
| 2015/0368146 A1 * | 12/2015 | Ellison .................. C03C 4/0092 362/612 |

FOREIGN PATENT DOCUMENTS

| | | |
|---|---|---|
| JP | 2006-232598 | 9/2006 |
| JP | 2013-151428 | 8/2013 |
| WO | WO 2011/152257 A1 | 12/2011 |
| WO | WO 2012/050119 A1 | 4/2012 |

OTHER PUBLICATIONS

International Search Report dated Apr. 19, 2016 in PCT/JP2016/057618 filed on Mar. 10, 2016.

* cited by examiner

*Primary Examiner* — Elizabeth A. Bolden
(74) *Attorney, Agent, or Firm* — Oblon, McClelland, Maier & Neustadt, L.L.P.

(57) ABSTRACT

To provide a highly transmissive glass and a light guide that allow high internal transmittance of plate glass to be maintained and the internal transmittance spectrum of the plate to be flattened without lowering the redox of iron to a value equal to or more than a certain value. This glass article comprises a glass which includes 1 to 80 mass ppm of total iron oxide (t-$Fe_2O_3$) in terms of $Fe_2O_3$, has a redox of iron of 0 to 50% and includes 0.01 to 4.0 mass ppm of NiO. The glass article and the light guide comprising the glass article are characterized in that an A value of the internal transmittance spectrum flatness is 0.83 or more.

20 Claims, 1 Drawing Sheet

GLASS ARTICLE AND LIGHT GUIDE

CROSS-REFERENCE TO RELATED APPLICATIONS

The present application is a continuation application of U.S. patent application Ser. No. 15/671,519 filed Aug. 8, 2017, which is in turn a continuation application of International Application No. PCT/JP2016/057618, filed Mar. 10, 2016, which claims priority to Japanese Patent Application No. 2015-052217, filed on Mar. 16, 2015. The contents of these applications are incorporated herein by reference in their entirety.

TECHNICAL FIELD

The present invention relates to a highly transmissive glass article having a high internal transmittance in the visible light region and having the internal transmittance spectrum more flattened, and a light guide using such a glass article.

BACKGROUND ART

An acrylic plate is widely used for a light guide of a planar light-emitting device of edge light type, such as a liquid crystal television, but, from the viewpoint of stiffness, heat resistance and water resistance, its replacement by a glass plate has been studied.

When a glass plate is applied as such a light guide, however, it has become apparent that as the optical path length becomes longer by a larger screen, light absorption inside the glass plate in the visible light region (wavelength of from 380 to 780 nm) tends to be not negligible, thus leading to a problem such as reduction of brightness or in-plane unevenness of brightness/color.

Therefore, as glass for the light guide, a glass article is required to have the influence of variation in light absorption inside of the glass plate further suppressed.

DISCLOSURE OF INVENTION

Technical Problem

The present invention is based on the above-mentioned findings, and an object thereof is to provide a glass article having the influence of variation in light absorption inside of the glass plate suppressed.

Solution to Problem

The present invention provides a glass article having the construction as defined in the following [1] and a light guide using such a glass article, having the construction as defined in the following [2].

[1] A glass article comprises a glass which includes from 1 mass ppm to 80 mass ppm of total iron oxide (t-$Fe_2O_3$) in terms of $Fe_2O_3$, has a redox of iron of from 0% to 50% and includes from 0.01 mass ppm to 4.0 mass ppm of NiO, characterized in that the A value of the internal transmittance spectrum flatness of the glass article obtained by the following formula (1) is at least 0.83:

$$A = \min(X, Y, Z)/\max(X, Y, Z) \quad \text{Formula (1)}$$

wherein using the color matching functions x ($\lambda$), y ($\lambda$) and z ($\lambda$) in the XYZ color system described in JIS Z8701, and an internal transmittance S ($\lambda$) at 600 mm length of the glass article, $X=\Sigma(S(\lambda) \times x(\lambda))$, $Y=\Sigma(S(\lambda) \times y(\lambda))$ and $Z=\Sigma(S(\lambda) \times z(\lambda))$ are defined.

[2] A light guide using the glass article as defined in the above [1].

Advantageous Effects of Invention

According to the present invention, it is possible to provide a glass article having the influence of variation in light absorption inside of the glass plate suppressed.

The glass article of the present invention is optimal for a light guide of a planar light-emitting device of edge light type, particularly for a light guide of a planar light-emitting device corresponding to a larger screen size of a liquid crystal display device such as a liquid crystal television.

DESCRIPTION OF EMBODIMENTS

The present invention has been made based on the following facts, findings and considerations.

The main factor for the optical absorption of the glass plate is iron ions contained as impurities. Iron is one inevitably contained as a raw material of glass which is produced industrially, and incorporation of iron into glass is unavoidable. Iron ions take divalent ($Fe^{2+}$) and trivalent ($Fe^{3+}$) forms in glass, and particularly problematic is $Fe^{2+}$ with a broad absorption in a wavelength of from 490 to 780 nm. $Fe^{3+}$ has an absorption band in a wavelength of from 380 to 490 nm, but the extinction coefficient per unit concentration is smaller by a single digit than $Fe^{2+}$, whereby its influence is small. Therefore, in order to reduce the light absorption in the visible region, it is necessary to design so as to bring the ratio of the $Fe^{+2}$ amount to total amount of iron ions in the glass to be as low as possible, i.e. to lower the redox of iron.

In a glass plate to be industrially produced, in order to reduce the total content of iron contained as impurities to such a level that the transmittance of the glass plate would be the same level as of an acrylic plate, many restrictions exist in terms of e.g. production and raw materials.

Within the acceptable range of the total content of iron, in order to increase the transmittance of the glass plate to the same level as the acrylic plate, it is essential to lower the redox of iron more than ever. It is theoretically possible to increase the transmittance of the glass plate by reducing the redox of iron, but, in the practical production of a glass plate, it is difficult to precisely control the redox of iron, and it is difficult to reduce the redox of iron to a level below a certain value.

In particular, at the time of studying adoption of a glass plate as a light guide for a planar light-emitting device of edge light type, such as a liquid crystal television, it is important to make the internal transmittance spectrum of the glass plate to be flat in the entire wavelength range of from 380 to 780 nm. If the internal transmittance spectrum of the glass plate is not flat, chromaticity difference occurs in the screen of the liquid crystal television. For example, in the light guide of the liquid crystal television, it is possible to accurately reproduce colors at a position close to the light source, since the propagation distance of light is short, but as the distance from the light source increases, the colors tend to be deviated as significantly affected by the absorption by iron. Particularly, as the liquid crystal television has a larger screen, chromaticity difference tends to be more likely to occur.

In order to quantify the internal transmittance spectrum of the above glass plate, the A value of the internal transmittance spectrum flatness of the glass article obtainable by the following formula (1), is adopted as an index of the internal transmittance spectrum flatness of the glass plate.

$$A = \min(X,Y,Z)/\max(X,Y,Z) \qquad \text{Formula (1)}$$

wherein using the color matching functions x ($\lambda$), y ($\lambda$) and z ($\lambda$) in the XYZ color system described in JIS Z8701, and the internal transmittance S ($\lambda$) at 600 mm length of the glass, $X=\Sigma(S(\lambda) \times x(\lambda))$, $Y=\Sigma(S(\lambda) \times y(\lambda))$ and $Z=\Sigma(S(\lambda) \times z(\lambda))$ are defined. As the glass plate for a light guide, the larger the A value, the flatter the internal transmittance spectrum. That is, it has been found that the A value is preferably higher.

Further, as a glass plate for the light guide for a planar light-emitting device of edge light type, it is important that the minimum value of the internal transmittance at 600 mm length of the glass plate in the wavelength range of from 400 to 700 nm i.e. in the visible light region, is at least 35%.

On the other hand, as a result of a study on the total amount of iron oxide contained in glass and the redox of iron, the present inventors have found that only by adjustment of the total amount of iron oxide and the redox of iron, it is difficult to accomplish making the internal transmittance spectrum of the glass plate at a wavelength of from 380 to 780 nm to be flatter.

The present inventors have made a further study based on the above-mentioned point, and a result, have found that by adding a proper amount of NiO to the glass, even when it is not possible to lower the redox of iron, it is possible to make the A value sufficiently large and to make the internal transmittance spectrum flatter.

In the present specification, a glass article collectively represents various glass articles including a flat glass plate with a predetermined thickness, a curved glass plate, a glass rod, a glass cylindrical tube, etc. In the present invention, the most typical glass article is a glass plate.

In this specification, the redox of iron is expressed by the following formula (2).

Redox of iron=(content of divalent iron ($Fe^{2+}$) in terms of $Fe_2O_3$)/[(total content of divalent iron ($Fe^{2+}$) and trivalent iron ($Fe^{3+}$), in terms of $Fe_2O_3(Fe^{2+}+Fe^{3+})$]     Formula (2)

Further, in this specification, components of glass are represented in terms of oxides such as $SiO_2$, $Al_2O_3$, etc., and the content of each component to the entire glass (glass composition) is represented by a mass percentage or mass ppm, expressed on an oxide basis (mass percentage may simply be referred to as %, or mass ppm may simply be referred to as ppm).

Further, in this specification, "to" indicating a numerical range is used in the sense of including the numerical values described before and after it as the lower limit and upper limit values, and unless otherwise specified, hereinafter in this specification, "to" will be used in the same sense.

Further, in the glass composition in the present specification, a glass component being "not substantially contained" means that such a component is not contained except for unavoidable impurities.

In this specification, as an index for flattening of the internal transmittance spectrum of the glass article, as described above, the value (A) obtained by the formula (1) is used, wherein using the color matching functions x ($\lambda$), y ($\lambda$) and z ($\lambda$) in the XYZ color system described in JIS Z8701, and the internal transmittance S ($\lambda$) at 600 mm length of the glass article, $X=\Sigma(S(\lambda) \times x(\lambda))$, $Y=\Sigma(S(\lambda) \times y(\lambda))$ and $Z=\Sigma(S(\lambda) \times z(\lambda))$ are defined:

$$A = \min(X,Y,Z)/\max(X,Y,Z) \qquad \text{Formula (1).}$$

Here, S ($\lambda$) is the internal transmittance at 600 mm length of the glass article, obtained at 5 nm intervals, within the wavelength range of from 380 nm to 780 nm.

Further, min (X, Y, Z) is the value of the smallest among X, Y and Z, and max (X, Y, Z) is the value of the largest among X, Y and Z. X is a stimulus value of red to the human eye, Y is a stimulus value of green to the human eye, and Z is a stimulus value of blue to the human eye. The value of min (X, Y, Z)/max (X, Y, Z) being large means that the stimulus values of the three colors are close to one another. When such glass is used as a light guide, color unevenness looks smaller to the human eye.

The internal transmittance S ($\lambda$) at 600 mm length of the glass article is experimentally obtainable, as follows.

A prepared glass block is processed into a rectangular parallelepiped with the long side being 50.0 mm and the other side being any length shorter than 50.0 mm, and all surfaces are polished to mirror surfaces. By means of a spectrophotometer, light is transmitted in the long side direction of the prepared glass rectangular parallelepiped, whereby the transmittance T ($\lambda$) is measured. As the spectrophotometer, for example, Spectrophotometer UH4150 manufactured by Hitachi High-Technologies Corporation may be used in combination with a detector made by the same company, capable of measuring a long sample. The transmittance T ($\lambda$) at 50.0 mm is obtained at 5 nm intervals in a wavelength range of from 380 nm to 780 nm.

Further, the refractive index of the glass rectangular parallelepiped at each wavelength of at least g-line (435.8 nm), F line (486.1 nm), e line (546.1 nm), d line (587.6 nm) and C line (656.3 nm), was measured by a V block method, for example by means of a precision refractometer KPR-2000, manufactured by Shimadzu Corp., and based on values thereby obtained, the respective coefficients $B_1$, $B_2$, $B_3$, $C_1$, $C_2$ and $C_3$ in the Sellmeier dispersion formula (the following formula (3)) are determined by the minimum square method. Accordingly, the refractive index n ($\lambda$) of the glass is obtainable.

$$n(\lambda)=[1+\{B_1\lambda^2/(\lambda^2-C_1)\}+\{B_2\lambda^2/(\lambda^2-C_2)\}+\{B_3\lambda^2/(\lambda^2-C_3)\}]^{0.5} \qquad \text{Formula (3)}$$

By the relational formula of the refractive index and the reflectance (the following formula (4)), the reflectance R ($\lambda$) on one surface of the glass rectangular parallelepiped is determined.

$$R(\lambda)=(n(\lambda)-1)^2/(n(\lambda)+1)^2 \qquad \text{Formula (4)}$$

The transmittance T ($\lambda$) is a measured value affected by the surface reflection of the glass rectangular parallelepiped, and therefore, in order to obtain the internal transmittance U ($\lambda$), it is necessary to remove the influence of the surface reflection. The internal transmittance U ($\lambda$) at 50 mm length of the glass article is obtained by the following formula (5).

$$U(\lambda)=-[(1-R(\lambda))^2+\{(1-R(\lambda))^4+4R(\lambda)^2T(\lambda)^2\}^{0.5}]/2R(\lambda)^2T(\lambda) \quad \text{Formula (5)}$$

The internal transmittance S ($\lambda$) at 600 mm length of the glass is obtained by the following formula (6).

$$S(\lambda)=U(\lambda)^{12} \quad \text{Formula (6)}$$

Now, one embodiment of the glass article of the present invention will be described in detail. In the following, a case where the glass article is in the form of a glass plate will be described as a representative case.

In the glass article of the present invention, the total amount of iron contained, the redox of iron and the content of NiO are selected within predetermined ranges, so that higher flatness of the internal transmittance spectrum at 600 mm length of the glass article at a wavelength of from 380 to 780 nm is obtainable, specifically so that the above-mentioned A value showing flatness of the internal transmittance spectrum becomes at least 0.83, and a higher transmittance is obtainable in the visible light region, specifically the internal transmittance at 600 mm length of the glass article in a wavelength of from 400 to 700 nm would be at least 35%.

The above-mentioned A value showing flatness of the internal transmittance spectrum is, as the glass article for a light guide, more preferably made to be at least 0.90, further preferably made to be at least 0.95.

Further, the minimum value of the internal transmittance of the glass article in the wavelength range of from 400 to 700 nm is preferably made to be at least 50%, further preferably made to be at least 75%.

That is, the glass of the glass article of the present invention, with respect to the total amount of components of the matrix composition of the glass, includes from 1 to 80 mass ppm of total iron oxide (t-$Fe_2O_3$) in terms of $Fe_2O_3$, has a redox of iron of from 0% to 50%, and includes NiO as an essential component, and its content is from 0.01 to 4.0 mass ppm.

More preferably, the content of total iron oxide is from 1 to 50 mass ppm, and the redox of iron is from 0% to 30%.

Particularly preferably, the content of total iron oxide is from 1 to 30 mass ppm, and the redox of iron is from 0% to 10%.

With respect to the content of NiO, the present inventors have found that by controlling the content of NiO based on the following formula, theoretically, it is possible to bring the internal transmittance spectrum of the glass article close to be flat.

Lower limit of NiO=$-2.7-0.035F+0.01R+0.0025FR$     Formula (7).

(The above formula may become to have a negative value, and in such a case, 0 should be taken as the lower limit.)

Upper limit of NiO=$2.4-0.055F+0.01R+0.002FR$     Formula (8)

In the above formulae (7) and (8), F is the content (mass ppm) of total iron in terms of $Fe_2O_3$. Further, R (%) is the redox of iron and is a value, as represented by a percentage, of the proportion of the content of $Fe^{2+}$ in terms of $Fe_2O_3$ to the content of total iron in terms of $Fe_2O_3$.

The content of NiO is, in order to satisfy the above-mentioned A value and minimum value of the internal transmittance in the visible region, preferably at most 4.0 ppm, more preferably at most 2.0 ppm, further preferably at most 1.0 ppm.

When the content of NiO is made to be at most 4.0 ppm, it becomes easy to obtain at least 0.83 as the A value showing the internal transmittance spectrum flatness of the glass article, and it becomes easy to obtain a high transmittance in the visible light region.

On the other hand, it has been found that a sulfur component which is intentionally added for refining, or which is included during the glass melting process for a glass article, or during the glass forming process, is likely to be combined with Fe in the glass to form iron sulfide thereby to cause coloration, thus leading to a decrease in the internal transmittance.

The theoretical content of NiO may be low as shown by the formula (7), but when the Ni component is present, it takes away the sulfur component to form nickel sulfide, whereby it is possible to prevent formation of iron sulfide and to reduce the coloration, and consequently, when Ni is contained, it is possible to maintain the internal transmittance spectrum of the glass article to be high. In order to make it possible to thus prevent formation of such iron sulfide, it is preferred to let NiO be contained in an amount of at least 0.01 ppm. Further, by letting NiO be contained in an amount of at least 0.01 ppm, it is possible to improve the solubility by absorption of infrared rays by the glass. Furthermore, with a view to preventing formation of iron sulfide and improving the solubility, it is more preferred to let NiO be contained in an amount of at least 0.1 ppm.

On the other hand, the content of total iron oxide (t-$Fe_2O_3$) in terms of $Fe_2O_3$ in glass of the glass article of the present invention, is in a range of from 1 to 80 mass ppm, preferably from 1 to 50 mass ppm, more preferably from 1 to 30 mass ppm.

If the amount of total iron oxide as described above is less than 1 ppm, the infrared absorption of the glass becomes extremely poor, whereby it becomes difficult to improve the solubility, and a considerable cost will be required for purification of the raw material, such being undesirable. On the other hand, if the amount of total iron oxide exceeds 80 ppm, coloration of the glass increases, whereby the performance as a light guide tends to be difficult, such being undesirable.

In the present invention, the total iron oxide content in glass of the glass article is represented as the amount of $Fe_2O_3$, but iron present in the glass is not all present as $Fe^{3+}$ (trivalent iron). Usually, in the glass, $Fe^{3+}$ and $Fe^{2+}$ (divalent iron) are present simultaneously. $Fe^{2+}$ and $Fe^{3+}$ have absorptions in the visible light region, but the absorption coefficient (11 $cm^{-1}$ $Mol^{-1}$) of $Fe^{2+}$ is larger by one digit than the absorption coefficient (0.96 $cm^{-1}$ $Mol^{-1}$) of $Fe^{3+}$, and thus more reduces the internal transmittance in the visible light region.

Therefore, the content of $Fe^{2+}$ should better be small in order to improve the internal transmittance in the visible light region. That is, in the glass of the glass article of the present invention, when the proportion of the content of $Fe^{2+}$ in terms of $Fe_2O_3$ in the total iron oxide in terms of $Fe_2O_3$, is taken as the redox of iron as described above, the redox of iron is made to be from 0% to 50%, preferably from 0% to 30%, more preferably from 0% to 10%.

When the content of $Fe^{2+}$ in the glass satisfies the above-mentioned range, the absorption of light inside the glass in the wavelength range of from 400 nm to 700 nm is suppressed, whereby it is possible to effectively use the glass of the present invention as a light guide for a liquid crystal television of edge light type.

As the matrix composition of glass for the glass article of the present invention, an multi-component oxide glass may be widely selected from those whereby the above-mentioned average internal transmittance in the visible region and the A value can be easily obtained.

In particular, the multi-component oxide glass to be used as glass for the glass article of the present invention, preferably contains little or no components showing absorption in the visible light region, in order to satisfy the above-mentioned minimum value of the average internal transmittance in the visible region and the A value.

As preferred matrix compositions of glass, the following three types (glasses having glass matrix composition A, glass matrix composition B, and glass matrix composition C) may be mentioned as typical examples. However, the glass matrix composition in the glass of the present invention is not limited to the examples of the glass matrix composition shown here.

As the glass having glass matrix composition A, preferred is one wherein the matrix composition of glass excluding total iron oxide (t-$Fe_2O_3$) in terms of $Fe_2O_3$, NiO, $CeO_2$ and other trace components with a content of at most 1,000 ppm, comprises, by mass percentage expressed on an oxide basis, substantially from 60 to 80% of $SiO_2$, from 0 to 7% of $Al_2O_3$, from 0 to 10% of MgO, from 0 to 20% of CaO, from 0 to 15% of SrO, from 0 to 15% of BaO, from 3 to 20% of $Na_2O$ and from 0 to 10% of $K_2O$.

Further, as the glass having glass matrix composition B, preferred is one wherein the matrix composition of glass excluding total iron oxide (t-$Fe_2O_3$) in terms of $Fe_2O_3$, NiO, $CeO_2$ and other trace components with a content of at most 1,000 ppm, comprises, by mass percentage expressed on an oxide basis, substantially from 45 to 80% of $SiO_2$, more than 7% and at most 30% of $Al_2O_3$, from 0 to 15% of $B_2O_3$, from 0 to 15% of MgO, from 0 to 6% of CaO, from 0 to 5% of SrO, from 0 to 5% of BaO, from 7 to 20% of $Na_2O$, from 0 to 10% of $K_2O$ and from 0 to 10% of $ZrO_2$.

Further, as the glass having glass matrix composition C, preferred is one wherein the matrix composition of glass excluding total iron oxide (t-$Fe_2O_3$) in terms of $Fe_2O_3$, NiO, $CeO_2$ and other trace components with a content of at most 1,000 ppm, comprises, by mass percentage expressed on an oxide basis, substantially from 45 to 70% of $SiO_2$, from 10 to 30% of $Al_2O_3$, from 0 to 15% of $B_2O_3$, from 5 to 30% in total of at least one type of alkaline earth metal oxide selected from the group consisting of MgO, CaO, SrO and BaO, and at least 0% and less than 3% in total of at least one type of alkali metal oxide selected from the group consisting of $Li_2O$, $Na_2O$ and $K_2O$.

The composition range of each component in the matrix composition of glass for the glass article of the present invention having the above-mentioned components will be described below.

$SiO_2$ is a main component of glass.

The content of $SiO_2$ is, in order to maintain weather resistance and devitrification property of glass, as represented by mass percentage expressed on an oxide basis, in the glass matrix composition A, preferably at least 60%, more preferably at least 63%, in the glass matrix composition B, preferably at least 45%, more preferably at least 50%, and in the glass matrix composition C, preferably at least 45%, more preferably at least 50%.

On the other hand, the content of $SiO_2$ is, in order to facilitate dissolution to make foam quality to be good, and also to control the content of divalent iron ($Fe^{2+}$) in glass to be low to make optical properties to be good, in the glass matrix composition A, preferably at most 80%, more preferably at most 75%, in the glass matrix composition B, preferably at most 80%, more preferably at most 70%, and in the glass matrix composition C, preferably at most 70%, more preferably at most 65%.

$Al_2O_3$ is, in the glass matrix compositions B and C, an essential component for improving the weather resistance of the glass. In order to maintain the weather resistance practically required for the glass of the present invention, the content of $Al_2O_3$ is, in the glass matrix composition A, preferably at least 1%, more preferably at least 2%, in the glass matrix composition B, preferably more than 7%, more preferably at least 10%, and in the glass matrix composition C, preferably at least 10%, more preferably at least 13%.

However, in order to control the content of divalent iron ($Fe^{2+}$) to be low, to make optical properties to be good and to make foam quality to be good, the content of $Al_2O_3$ is, in the glass matrix composition A, preferably at most 7%, more preferably at most 5%, in the glass matrix composition B, preferably at most 30%, more preferably at most 23%, and in the glass matrix composition C, preferably at most 30%, more preferably at most 20%.

$B_2O_3$ is a component to facilitate melting of glass raw material and to improve mechanical properties and weather resistance, but in order to avoid troubles such as formation of striae (ream), erosion of the furnace wall, etc. due to volatilization by its addition to the glass of soda lime silicate type of the present invention, the content of $B_2O_3$ is, in the glass matrix compositions B and C, preferably at most 15%, more preferably at most 12%.

Alkali metal oxides such as $Li_2O$, $Na_2O$ and $K_2O$ are components which facilitate melting of the glass raw material, and which are useful to adjust thermal expansion, viscosity, etc.

Therefore, the content of $Na_2O$ is, in the glass matrix compositions A and B, preferably at least 8%, more preferably at least 11%. However, in order to control the foam disappearance start temperature (TD) to be low, to maintain the clarity upon dissolution, and to maintain the foam quality of the glass to be produced, the content of $Na_2O$ is, in the glass matrix compositions A and B, preferably set to be at most 15%, and in the glass matrix composition C, preferably set to be at most 2%, more preferably at most 1%.

Further, the content of $K_2O$ is, in the glass matrix compositions A and B, preferably at most 8%, more preferably at most 5%, and in the glass matrix composition C, preferably at most 2%, more preferably at most 1%.

Further, $Li_2O$ is an optional component, but in order to facilitate vitrification, to control the iron content contained as an impurity derived from raw materials to be low and to reduce the batch cost, $Li_2O$ may be contained in an amount of at most 2% in the glass matrix compositions A, B and C.

Further, the total content of these alkali metal oxides ($Li_2O+Na_2O+K_2O$) is, in order to control the foam disappearance start temperature (TD) to be low, to maintain the clarity upon dissolution, and to maintain the foam quality of the glass to be produced, in the glass matrix compositions A and B, preferably from 5 to 20%, more preferably from 8% to 15%, and in the glass matrix composition C, preferably from 0% to 2%, more preferably from 0% to 1%.

Alkaline earth metal oxides such as MgO, CaO, SrO and BaO are components which facilitate melting of glass raw materials, and which are useful to adjust thermal expansion, viscosity, etc.

MgO has an effect to lower the viscosity at the time of glass melting and to facilitate dissolution. Further, it has an effect to reduce the specific gravity and to make the glass article to be less susceptible to flaws, and therefore, it may be contained in the glass matrix compositions A, B and C. Further, in order to control the thermal expansion coefficient of the glass to be low, and to bring the devitrification property to be good, the content of MgO is, in the glass matrix composition A, preferably at most 8%, more preferably at most 5%, in the glass matrix composition B, preferably at most 13%, more preferably at most 10%, and in the glass matrix composition C, preferably at most 10%, more preferably at most 5%.

CaO is a component to facilitate melting of glass raw materials and also to adjust viscosity, thermal expansion, etc., and therefore, may be contained in the glass matrix composition A, B and C. In order to obtain the above-mentioned effects, in the glass matrix composition A, the content of CaO is preferably at least 3%, more preferably at least 5%. Further, in order to improve the devitrification, it is, in the glass matrix composition A, preferably at most 10%, more preferably at most 5%, in the glass matrix composition B, preferably at most 5%, more preferably at most 2%, and in the glass matrix composition C, preferably at most 10%.

SrO has an effect to lower the increase of the thermal expansion coefficient and the high temperature viscosity of the glass. In order to obtain such an effect, SrO may be contained in the glass matrix composition A, B and C. The content of SrO is, in the glass matrix composition A and C, preferably at least 1%, more preferably at least 2%. However, in order to control the thermal expansion coefficient of the glass to be low, the content of SrO is, in the glass matrix composition A, preferably at most 10%, more preferably at most 7%, in the glass matrix composition B, preferably at most 10%, more preferably at most 5%, and in the glass matrix composition C, preferably at most 10%.

BaO has, like SrO, an effect to lower the increase of the thermal expansion coefficient and the high temperature viscosity of the glass. In order to obtain such an effect, BaO may be contained. The content of BaO is, in the glass matrix compositions A and C, preferably at least 1%, more preferably at least 2%. However, in order to control the thermal expansion coefficient of the glass to be low, the content of BaO is, in the glass matrix composition A, preferably at most 10%, more preferably at most 7%, in the glass matrix composition B, preferably at most 10%, more preferably at most 5% and in the glass matrix composition C, preferably at most 10%.

Further, the total content of these alkaline earth metal oxides (MgO+CaO+SrO+BaO) to be contained, is, in order to control the thermal expansion coefficient to be low, to adjust the devitrification characteristics to be good, and to maintain the strength, in the glass matrix composition A, preferably from 10% to 30%, more preferably from 13% to 27%, in the glass matrix composition B, preferably from 1% to 15%, more preferably from 3% to 10%, and in the glass matrix composition C, preferably from 5 to 30%, more preferably from 10% to 20%.

In the glass matrix composition of glass for the glass article of the present invention, in order to improve the heat resistance and surface hardness of the glass, $ZrO_2$ as an optional component, may be contained, in the glass matrix compositions A, B and C, in an amount of at most 15%, preferably at most 5%. However, if it exceeds 15%, the glass tends to be devitrified, such being undesirable.

Glass for the glass article of the present invention, may contain $SnO_2$ used as a fining agent. In such a case, the content of total tin in terms of $SnO_2$ is, as represented by mass percentage, preferably from 0 to 1%. It is more preferably at most 0.5%, further preferably at most 0.2%, particularly preferably at most 0.1%, and still further preferably not substantially contained.

Further, glass for the glass article of the present invention may contain $SO_3$ used as a fining agent. In such a case, the $SO_3$ content is preferably more than 0% and at most 0.5%, as represented by mass percentage. It is more preferably at most 0.3%, further preferably at most 0.2%, still more preferably at most 0.1%.

Further, glass for the glass article of the present invention may contain $Sb_2O_3$ or $As_2O_3$ used as an oxidizing agent and a fining agent. In such a case, the content of $Sb_2O_3$ or $As_2O_3$ is preferably from 0 to 0.5% as represented by mass percentage. It is more preferably at most 0.2%, further preferably at most 0.1%, and still more preferably not substantially contained.

However, $Sb_2O_3$, $SnO_2$ and $As_2O_3$ function as an oxidizing agent for glass, and therefore may be added within the above mentioned ranges, for the purpose of adjusting the amount of $Fe^{2+}$ of the glass. However, $As_2O_3$ is not one to be positively incorporated from the viewpoint of the environment.

Further, glass for the glass article of the present invention may contain $Cr_2O_3$. When $Cr_2O_3$ is contained, $Cr_2O_3$ also functions as a coloring component, and therefore, the content of $Cr_2O_3$ is preferably made to be at most 5 ppm to the total amount of the glass matrix composition as described above. In particular, $Cr_2O_3$ is, from the viewpoint of not lowering the internal transmittance of the glass article at a wavelength of from 400 to 700 nm, preferably at most 1.0 ppm. However, Cr is a component that is contained in a heat-resistant steel, and a heat resistant steel is used in the glass production process in many cases. Therefore, inclusion of a certain amount of $Cr_2O_3$ is inevitable. A great cost is required to completely remove $Cr_2O_3$, and therefore, the content of $Cr_2O_3$ is preferably made to be at least 0.1 ppm.

Glass for the glass article of the present invention may contain $MnO_2$. When $MnO_2$ is contained, $MnO_2$ also functions as a component which absorbs visible light, and therefore, the content of $MnO_2$ is preferably made to be at most 50 ppm to the total amount of the glass matrix composition as described above. Particularly from the viewpoint of not lowering the internal transmittance of the glass article at a wavelength of from 400 to 700 nm, $MnO_2$ is preferably made to be at most 10 ppm.

Glass of the glass article of the present invention may contain $TiO_2$. When $TiO_2$ is contained, $TiO_2$ also functions as a component which absorbs visible light, and therefore, the content of $TiO_2$ is preferably made to be at most 1,000 ppm to the total amount of the glass matrix composition as described above. From the viewpoint of not lowering the internal transmittance of the glass article at a wavelength of from 400 to 700 nm, the content of $TiO_2$ is more preferably made to be at most 100 ppm, particularly preferably made to be at most 10 ppm.

Glass for the glass article of the present invention may contain $CeO_2$. $CeO_2$ has an effect to lower the redox of iron and is capable of reducing the absorption of the glass at a wavelength of from 400 to 700 nm. However, if $CeO_2$ is contained in a large amount, $CeO_2$ also functions as a component which absorbs visible light, and therefore, the content of $CeO_2$ is preferably made to be at most 1,000 ppm to the total amount of the glass matrix composition as described above. Further, the content of $CeO_2$ is more preferably made to be at most 400 ppm, particularly preferably made to be at most 200 ppm.

Glass for the glass article of the present invention may contain at least one member selected from the group consisting of CoO, $V_2O_5$ and CuO. When these components are contained, these components will also function as components which absorb visible light, and therefore, the content of at least one member selected from the group consisting of CoO, $V_2O_5$ and CuO is preferably made to be at most 10 ppm to the total amount of the glass matrix composition. Particularly, from the viewpoint of not lowering the internal transmittance of the glass article at a wavelength of from 400 to 700 nm, these components are preferably not substantially contained.

In glass for the glass article of the present invention, it has been found it preferred to control the contents of NiO and $Cr_2O_3$ to satisfy the following formula (9), by mass ppm expressed on an oxide basis.

That is, since the average absorption coefficient of NiO at a wavelength of from 400 to 700 nm is about twice the average absorption coefficient of $Cr_2O_3$ at a wavelength of from 400 to 700 nm, the following relation formula has been obtained with respect to the contents of NiO and $Cr_2O_3$.

$$0.1 \leq [NiO]+2[Cr_2O_3] \leq 5.0 \quad \text{Formula (9)}$$

Here, [NiO] is the content (ppm) of NiO, and $[Cr_2O_3]$ is the content (ppm) of $Cr_2O_3$.

$[NiO]+2[Cr_2O_3]$ is, from the viewpoint of not lowering the internal transmittance of the glass article at a wavelength of from 400 to 700 nm, at most 5.0, preferably at most 3.0, more preferably at most 2.0. Further, $[NiO]+2[Cr_2O_3]$, from the viewpoint of not increasing the production cost, at least 0.1, preferably at least 0.2, more preferably at least 0.3.

The glass article of the present invention is superior in rigidity, heat resistance and water resistance to an acrylic plate which has heretofore been used as a light guide plate.

In the case of using the glass article of the present invention as a light guide of the liquid crystal television of edge light type, the shape of the glass article of the present invention is a glass plate. The thickness of the glass plate to be used in the above application is preferably at least 0.2 mm. The upper limit of the thickness of the glass plate is not particularly limited, but practically, preferably at most 5 mm. In the case of using it as a glass plate of the light guide of the above application, it is preferred that the length of at least one side to be the optical path length is at least 200 mm.

As described above, according to the present invention, it is possible to provide a glass article for a light guide, comprises of multicomponent oxide glass which includes from 1 mass ppm to 80 mass ppm of total iron oxide (t-$Fe_2O_3$) in terms of $Fe_2O_3$, has a redox of iron of from 0% to 50%, and includes from 0.01 mass ppm to 4.0 mass ppm of NiO.

In a case where the glass article of the present invention is a glass plate, by a conventional method, after dissolving the glass raw materials blended to have the composition ratios in the glass plate to be produced, to obtain a molten glass, the molten glass is molded by using any one molding method selected from the group consisting of a float method, a roll out method, a drawing method and a fusion method, to obtain a glass plate.

EXAMPLES

Now, Examples of the present invention will be described.

Ex. 1

As glass for the glass article of the present invention, a multi-component oxide glass (soda-lime silicate glass) was used. The matrix composition of the glass used was as follows. This matrix glass composition does not contain total iron oxide, NiO, $Cr_2O_3$, $MnO_2$, $CeO_2$ and other trace components with a content of at most 1,000 ppm. This glass corresponds to the above-described glass matrix composition A.

$SiO_2$: 70.0%,
$Al_2O_3$: 3.0%,
$Na_2O$: 11.0%,
CaO: 8.0%,
SrO: 4.0%,
BaO: 4.0%.

To the total amount of glass components of the above matrix composition, total iron oxide in terms of $Fe_2O_3$ was incorporated in an amount of 20 ppm, NiO content was made to be 4.0 ppm, 3.0 ppm, 2.0 ppm, 1.0 ppm and 0 ppm, $CeO_2$ was incorporated in an amount of 300 ppm, and the redox of iron was adjusted to be 20%, to obtain samples (five types) of the glass article.

Here, in the preparation of the glass, raw materials were adjusted to have the above-mentioned glass composition to prepare a glass batch with a target composition, and this batch was put in a platinum-rhodium crucible, melted in an electric furnace, cast on a carbon plate and then gradually cooled in a separate electric furnace.

The obtained glass block was cut, and a portion was polished, whereupon by a fluorescent X-ray analyzer, the content (mass ppm) of total iron oxide in terms of $Fe_2O_3$ was obtained. The content of $Fe^{2+}$ was measured in accordance with ASTM C169-92. Here, the measured content of $Fe^{2+}$ was represented in terms of $Fe_2O_3$, whereupon the redox of iron was calculated by the formula (2), to confirm that it was as intended.

Redox of Iron=(content of divalent iron ($Fe^{2+}$) in terms of $Fe_2O_3$/[content of total of divalent iron ($Fe^{2+}$) and trivalent iron ($Fe^{3+}$), in terms of $Fe_2O_3(Fe^{2+}+Fe^{3+})$] \quad Formula (2)

The physical property values of the obtained glass are as follows.

Tg (glass transition temperature): 562° C.
T2 (temperature at which glass viscosity becomes to be $10^2$ poises): 1,466° C.
T4 (temperature at which glass viscosity becomes to be $10^4$ poises): 1,042° C.
Specific gravity: 2.59

Further, the surface of another glass block was polished to be mirror-surfaced and finished to obtain a glass rectangular parallelepiped with long sides being 50.0 mm, whereupon measurement of the transmittance was conducted by using Spectrophotometer UH4150 manufactured by Hitachi High-Technologies Corporation, combined with a sample holder manufactured by Hitachi High-Technologies Corporation capable of measuring a long sample, and measurement of the refractive index was conducted by using Precision Refractometer KPR-2000 manufactured by Shimadzu Corporation. Using these results, the internal transmittance S (λ) at 600 mm length of glass was obtained by the above-mentioned method. Further, with respect to the samples (five types) of the glass article obtained from the above glass block, using the color matching functions x (λ), y (λ) and z (λ) in the XYZ color system described in JIS Z8701, and the internal transmittance S (λ) in 600 mm length of the glass, X=Σ(S (λ)×x(λ)), Y=Σ(S(λ)×y(λ)), and Z=Σ(S(λ)×z(λ)), were, respectively, obtained, and internal transmittance spectrum flatness A=min (X, Y, Z)/max (X, Y, and Z) was obtained. Further, the minimum value of the internal transmittance at 600 mm length of the glass article at a wavelength of from 400 to 700 nm was obtained. The results are shown in Table 1.

TABLE 1

| Sample No. | 1-1 | 1-2 | 1-3 | 1-4 | 1-5 |
|---|---|---|---|---|---|
| NiO (ppm) | 4.0 | 3.0 | 2.0 | 1.0 | 0 |
| Total iron oxide (ppm) | 20 | 20 | 20 | 20 | 20 |
| Redox of iron (%) | 20 | 20 | 20 | 20 | 20 |
| X | 71.2 | 77.4 | 84.2 | 91.6 | 99.7 |
| Y | 72.6 | 79.0 | 86.1 | 93.7 | 102.1 |
| Z | 60.9 | 69.0 | 78.3 | 88.9 | 101.0 |
| Internal transmittance spectrum flatness A | 0.84 | 0.87 | 0.91 | 0.95 | 0.98 |
| Minimum value (%) of internal transmittance | 50 | 59 | 68 | 78 | 81 |

Ex. 2

Using glass having the same matrix composition as in Ex. 1, to the total amount of glass components of this matrix composition, total iron oxide in terms of $Fe_2O_3$ was incorporated in an amount of 20 ppm, the content of NiO was made to be 4.0 ppm, 3.0 ppm, 2.0 ppm, 1.0 ppm and 0 ppm, $CeO_2$ was incorporated in an amount of 50 ppm, and the redox of iron was adjusted to be 30%, to obtain samples (five types) of the glass article. With respect to the obtained glass article, in the same manner as Ex. 1, X, Y and Z, as well as, internal transmittance spectrum flatness A=min (X, Y, Z)/max (X, Y, Z) were obtained. Further, the minimum value of the internal transmittance at 600 mm length of the glass article at a wavelength of from 400 to 700 nm was obtained. The results are shown in Table 2.

TABLE 2

| Sample No. | 2-1 | 2-2 | 2-3 | 2-4 | 2-5 |
|---|---|---|---|---|---|
| NiO (ppm) | 4.0 | 3.0 | 2.0 | 1.0 | 0 |
| Total iron oxide (ppm) | 20 | 20 | 20 | 20 | 20 |
| Redox of iron (%) | 30 | 30 | 30 | 30 | 30 |
| X | 70.4 | 76.5 | 83.2 | 90.6 | 98.6 |
| Y | 72.1 | 78.5 | 85.5 | 93.1 | 101.4 |
| Z | 61.8 | 70.1 | 79.5 | 90.3 | 102.5 |
| Internal transmittance spectrum flatness A | 0.86 | 0.89 | 0.93 | 0.97 | 0.96 |
| Minimum value (%) of internal transmittance | 51 | 60 | 69 | 71 | 74 |

Ex. 3

Using glass having the same matrix composition as in Ex. 1, to the total amount of glass components of this matrix composition, total iron oxide in terms of $Fe_2O_3$ was incorporated in an amount of 20 ppm, the content of NiO was made to be 4.0 ppm, 3.0 ppm, 2.0 ppm, 1.0 ppm and 0 ppm, and the redox of iron was adjusted to be 40%, to obtain samples (five types) of the glass article. With respect to the obtained glass article, in the same manner as Ex. 1, X, Y and Z, as well as, internal transmittance spectrum flatness A=min (X, Y, Z)/max (X, Y, Z) were obtained. Further, the minimum value of the internal transmittance at 600 mm length of the glass article at a wavelength of from 400 to 700 nm was obtained. The results are shown in Table 3.

TABLE 3

| Sample No. | 3-1 | 3-2 | 3-3 | 3-4 | 3-5 |
|---|---|---|---|---|---|
| NiO (ppm) | 4.0 | 3.0 | 2.0 | 1.0 | 0 |
| Total iron oxide (ppm) | 20 | 20 | 20 | 20 | 20 |
| Redox of iron (%) | 40 | 40 | 40 | 40 | 40 |
| X | 69.6 | 75.6 | 82.3 | 89.6 | 97.6 |
| Y | 71.7 | 78.0 | 85.0 | 92.6 | 100.8 |
| Z | 62.7 | 71.1 | 80.7 | 91.6 | 104.0 |
| Internal transmittance spectrum flatness A | 0.87 | 0.91 | 0.95 | 0.97 | 0.94 |
| Minimum value (%) of internal transmittance | 52 | 61 | 63 | 65 | 67 |

Ex. 4

Using glass having the same matrix composition as in Ex. 1, to the total amount of glass components of this matrix composition, total iron oxide in terms of $Fe_2O_3$ was incorporated in an amount of 20 ppm, the content of NiO was made to be 4.0 ppm, 3.0 ppm, 2.0 ppm, 1.0 ppm and 0 ppm, and the redox of iron was adjusted to be 50%, to obtain samples (five types) of the glass article. With respect to the obtained glass article, in the same manner as Ex. 1, X, Y and Z, as well as, internal transmittance spectrum flatness A=min (X, Y, Z)/max (X, Y, Z) were obtained. Further, the minimum value of the internal transmittance at 600 mm length of the glass article at a wavelength of from 400 to 700 nm was obtained. The results are shown in Table 4.

TABLE 4

| Sample No. | 4-1 | 4-2 | 4-3 | 4-4 | 4-5 |
|---|---|---|---|---|---|
| NiO (ppm) | 4.0 | 3.0 | 2.0 | 1.0 | 0 |
| Total iron oxide (ppm) | 20 | 20 | 20 | 20 | 20 |
| Redox of iron (%) | 50 | 50 | 50 | 50 | 50 |
| X | 68.7 | 74.8 | 81.4 | 88.6 | 96.6 |
| Y | 71.2 | 77.5 | 84.4 | 92.0 | 100.2 |
| Z | 63.5 | 72.1 | 81.8 | 92.8 | 105.5 |
| Internal transmittance spectrum flatness A | 0.89 | 0.93 | 0.96 | 0.95 | 0.92 |
| Minimum value (%) of internal transmittance | 53 | 56 | 58 | 60 | 61 |

Figure 1:
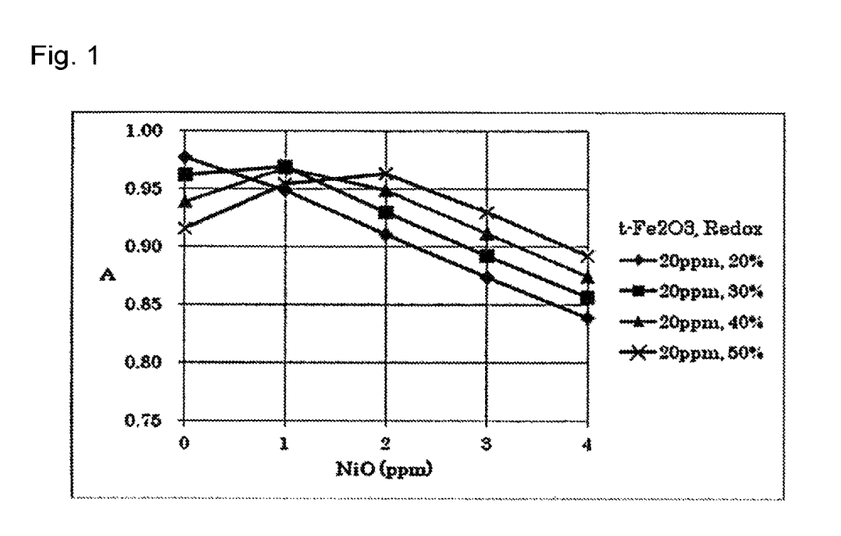
FIG. 1 is a diagram obtained by plotting the relationship between the content of NiO and the A value of the internal transmittance spectrum flatness (min (X, Y, Z)/max (X, Y, Z)), of samples obtained in Examples 1 to 4.

FIG. 1 is a drawing obtained by plotting the relationship between the content of NiO and the internal transmittance spectrum flatness A=min (X, Y, Z)/max (X, Y, Z) with respect to the respective samples of glass articles obtained in Ex. 1 to 4, wherein total iron oxide in terms of $Fe_2O_3$ was incorporated in an amount of 20 ppm, the content of NiO was made to be 4.0 ppm, 3.0 ppm, 2.0 ppm, 1.0 ppm and 0 ppm, and the redox of iron was made to be 20%, 30%, 40% and 50%.

In Ex. 1 to 4, in cases where the amount of total iron was made to be 20 ppm and the redox of iron was made to be 20%, 30%, 40% and 50%, the following results can be read from the graph in FIG. 1 showing the relationship between the content of NiO and the A value.

In the case where the redox is from 20 to 50%, the A value shows a value of at least 0.83 over a range of the content of NiO being from 0 to 4.0 ppm.

In the case where the redox is 30%, the A value is maximized when the content of NiO is at about 1.0 ppm.

In the case where the redox is 40%, the A value is maximized when the content of NiO is at about 1.0 ppm.

In the case where the redox is 50%, the A value is maximized when the content of NiO is at about 2.0 ppm.

Ex. 5

Using glass having the same matrix composition as in Ex. 1, to the total amount of glass components of this matrix composition, total iron oxide in terms of $Fe_2O_3$ was incorporated in an amount of 40 ppm, the content of NiO was made to be 4.0 ppm, 3.0 ppm, 2.0 ppm, 1.0 ppm and 0 ppm, $CeO_2$ was incorporated in an amount of 50 ppm, and the redox of iron was adjusted to be 20%, to obtain samples (five types) of the glass article. With respect to the obtained glass article, in the same manner as Ex. 1, X, Y and Z, as well as, internal transmittance spectrum flatness A=min (X, Y, Z)/max (X, Y, Z) were obtained. Further, the minimum value of the internal transmittance at 600 mm length of the glass article at a wavelength of from 400 to 700 nm was obtained. The results are shown in Table 5.

TABLE 5

| Sample No. | 5-1 | 5-2 | 5-3 | 5-4 | 5-5 |
|---|---|---|---|---|---|
| NiO (ppm) | 4.0 | 3.0 | 2.0 | 1.0 | 0 |
| Total iron oxide (ppm) | 40 | 40 | 40 | 40 | 40 |
| Redox of iron (%) | 20 | 20 | 20 | 20 | 20 |
| X | 66.7 | 72.5 | 78.9 | 85.9 | 93.5 |
| Y | 69.5 | 75.7 | 82.4 | 89.7 | 97.8 |
| Z | 57.7 | 65.4 | 74.2 | 84.2 | 95.6 |
| Internal transmittance spectrum flatness A | 0.83 | 0.86 | 0.90 | 0.94 | 0.96 |
| Minimum value (%) of internal transmittance | 47 | 55 | 62 | 64 | 66 |

Ex. 6

Using glass having the same matrix composition as in Ex. 1, to the total amount of glass components of this matrix composition, total iron oxide in terms of $Fe_2O_3$ was incorporated in an amount of 40 ppm, the content of NiO was made to be 4.0 ppm, 3.0 ppm, 2.0 ppm, 1.0 ppm and 0 ppm, $CeO_2$ was incorporated in an amount of 50 ppm, and the redox of iron was adjusted to be 30%, to obtain samples (five types) of the glass article. With respect to the obtained glass article, in the same manner as Ex. 1, X, Y and Z, as well as, internal transmittance spectrum flatness A=min (X, Y, Z)/max (X, Y, Z) were obtained. Further, the minimum value of the internal transmittance at 600 mm length of the glass article at a wavelength of from 400 to 700 nm was obtained. The results are shown in Table 6.

TABLE 6

| Sample No. | 6-1 | 6-2 | 6-3 | 6-4 | 6-5 |
|---|---|---|---|---|---|
| NiO (ppm) | 4.0 | 3.0 | 2.0 | 1.0 | 0 |
| Total iron oxide (ppm) | 40 | 40 | 40 | 40 | 40 |
| Redox of iron (%) | 30 | 30 | 30 | 30 | 30 |
| X | 65.3 | 71.0 | 77.3 | 84.2 | 91.7 |
| Y | 68.7 | 74.8 | 81.5 | 88.8 | 96.7 |
| Z | 59.3 | 67.3 | 76.4 | 86.7 | 98.4 |
| Internal transmittance spectrum flatness A | 0.86 | 0.90 | 0.94 | 0.95 | 0.93 |
| Minimum value (%) of internal transmittance | 49 | 51 | 52 | 54 | 56 |

Ex. 7

Using glass having the same matrix composition as in Ex. 1, to the total amount of glass components of this matrix composition, total iron oxide in terms of $Fe_2O_3$ was incorporated in an amount of 40 ppm, the content of NiO was made to be 4.0 ppm, 3.0 ppm, 2.0 ppm, 1.0 ppm and 0 ppm, and the redox of iron was adjusted to be 40%, to obtain samples (five types) of the glass article. With respect to the obtained glass article, in the same manner as Ex. 1, X, Y and Z, as well as, internal transmittance spectrum flatness A=min (X, Y, Z)/max (X, Y, Z) were obtained. Further, the minimum value of the internal transmittance at 600 mm length of the glass article at a wavelength of from 400 to 700 nm was obtained. The results are shown in Table 7.

TABLE 7

| Sample No. | 7-1 | 7-2 | 7-3 | 7-4 | 7-5 |
|---|---|---|---|---|---|
| NiO (ppm) | 4.0 | 3.0 | 2.0 | 1.0 | 0 |
| Total iron oxide (ppm) | 40 | 40 | 40 | 40 | 40 |
| Redox of iron (%) | 40 | 40 | 40 | 40 | 40 |
| X | 63.9 | 69.6 | 75.8 | 82.5 | 90.0 |
| Y | 67.9 | 74.0 | 80.6 | 87.8 | 95.7 |
| Z | 61.0 | 69.1 | 78.4 | 89.1 | 101.2 |
| Internal transmittance spectrum flatness A | 0.90 | 0.93 | 0.94 | 0.93 | 0.89 |
| Minimum value (%) of internal transmittance | 41 | 43 | 44 | 46 | 47 |

Ex. 8

Using glass having the same matrix composition as in Ex. 1, to the total amount of glass components of this matrix composition, total iron oxide in terms of $Fe_2O_3$ was incorporated in an amount of 40 ppm, the content of NiO was made to be 4.0 ppm, 3.0 ppm, 2.0 ppm, 1.0 ppm and 0 ppm, and the redox of iron was adjusted to be 50%, to obtain samples (five types) of the glass article. With respect to the obtained glass article, in the same manner as Ex. 1, X, Y and Z, as well as, internal transmittance spectrum flatness A=min (X, Y, Z)/max (X, Y, Z) were obtained. Further, the minimum value of the internal transmittance at 600 mm length of the glass article at a wavelength of from 400 to 700 nm was obtained. The results are shown in Table 8.

TABLE 8

| Sample No. | 8-1 | 8-2 | 8-3 | 8-4 | 8-5 |
|---|---|---|---|---|---|
| NiO (ppm) | 4.0 | 3.0 | 2.0 | 1.0 | 0 |
| Total iron oxide (ppm) | 40 | 40 | 40 | 40 | 40 |
| Redox of iron (%) | 50 | 50 | 50 | 50 | 50 |
| X | 62.6 | 68.1 | 74.2 | 80.9 | 88.3 |
| Y | 67.1 | 73.1 | 79.7 | 86.8 | 94.7 |
| Z | 62.5 | 70.9 | 80.5 | 91.3 | 103.7 |
| Internal transmittance spectrum flatness A | 0.93 | 0.93 | 0.92 | 0.89 | 0.85 |
| Minimum value (%) of internal transmittance | 35 | 36 | 37 | 38 | 39 |

Figure 2:
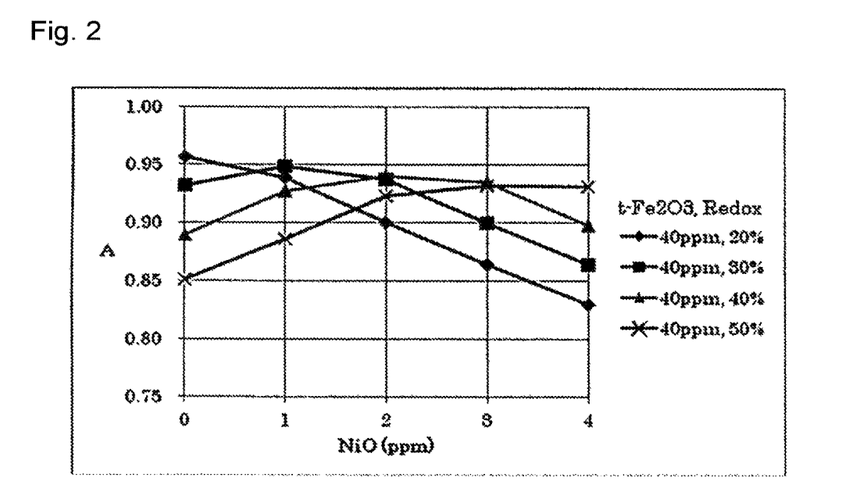
FIG. 2 is a diagram obtained by plotting the relationship between the content of NiO and the A value of the internal transmittance spectrum flatness (min (X, Y, Z)/max (X, Y, Z)), of samples obtained in Examples 5 to 8.

FIG. 2 is a drawing obtained by plotting the relationship between the content of NiO and the internal transmittance spectrum flatness A=min (X, Y, Z)/max (X, Y, Z) with respect to the respective samples of glass articles obtained in Ex. 5 to 8, wherein total iron oxide in terms of $Fe_2O_3$ was incorporated in an amount of 40 ppm, the content of NiO was made to be 4.0 ppm, 3.0 ppm, 2.0 ppm, 1.0 ppm and 0 ppm, and the redox of iron was made to be 20%, 30%, 40% and 50%.

In Ex. 5 to 8, in cases where the amount of total iron was made to be 40 ppm and the redox of iron was made to be 20%, 30%, 40% and 50%, the following results can be read from the graph in FIG. 2 showing the relationship between the content of NiO and the A value.

In the case where the redox is from 20 to 50%, the A value shows a value of at least 0.83 over a range of the content of NiO being from 0 to 4.0 ppm.

In the case where the redox is 30%, the A value is maximized when the content of NiO is at about 1.0 ppm.

In the case where the redox is 40%, the A value is maximized when the content of NiO is at about 2.0 ppm.

In the case where the redox is 50%, the A value is maximized when the content of NiO is at about 3.0 ppm.

Ex. 9

Using glass having the same matrix composition as in Ex. 1, to the total amount of glass components of this matrix composition, total iron oxide in terms of $Fe_2O_3$ was incorporated in an amount of 20 ppm, the content of NiO was made to be 1.0 ppm, the content of $CeO_2$ was made to be 300 ppm, the content of $Cr_2O_3$ was made to be 1.0 ppm, the content of $MnO_2$ was made to be 10 ppm, and the redox of iron was adjusted to be 10%, to obtain a sample of the glass article. With respect to the obtained glass article, in the same manner as Ex. 1, X, Y, Z and z (λ), as well as internal transmittance spectrum flatness A=min (X, Y, Z)/max (X, Y, Z) were obtained. X was 91.0, Y was 93.5, Z was 85.3, and the internal transmittance spectrum flatness A was 0.91. Further, the minimum value of the internal transmittance at 600 mm length of the glass article at a wavelength of from 400 to 700 nm was 76%.

Ex. 10

Using glass having the same matrix composition as in Ex. 1, to the total amount of glass components of this matrix composition, total iron oxide in terms of $Fe_2O_3$ was incorporated in an amount of 15 ppm, the content of NiO was made to be 0.2 ppm, the content of $CeO_2$ was made to be 0 ppm, the content of $Cr_2O_3$ was made to be 0.2 ppm, the content of $MnO_2$ was made to be 0.5 ppm, and the redox of iron was adjusted to be 10%, to obtain a sample of the glass article. With respect to the obtained glass article, in the same manner as Ex. 1, X, Y, Z and z (λ), as well as internal transmittance spectrum flatness A=min (X, Y, Z)/max (X, Y, Z) were obtained. X was 97.7, Y was 99.3, Z was 94.6, and the internal transmittance spectrum flatness A was 0.95. Further, the minimum value of the internal transmittance at 600 mm length of the glass article at a wavelength of from 400 to 700 nm was 86%.

INDUSTRIAL APPLICABILITY

According to the present invention, it is possible to provide a glass article which has a high transmittance such that the minimum value of the average internal transmittance in the visible light region is at least 35%, has an internal transmittance spectrum more flattened so that the A value for the internal transmittance spectrum of the glass article is at least 0.83, is less susceptible to reduction of brightness or in-plane unevenness of brightness/color, and has heat resistance. The glass article of the present invention is useful for a light guide, but its application is not limited to this, and it is useful in applications where a high visible light transmittance is required.

The glass article of the present invention is optimal for a light guide of a planar light-emitting device of edge light type, particularly for a light guide to accommodate enlargement of the screen size of a liquid crystal display device such as a liquid crystal television.

What is claimed is:

1. A light guide comprising a plate of glass, the glass comprising:

from 1 mass ppm to 40 mass ppm of total iron oxide in terms of $Fe_2O_3$, having a redox of iron of from 0% to 50%; and from 0.01 mass ppm to 1.0 mass ppm of NiO, wherein the redox of iron is a ratio of a content of $Fe^{2+}$ in terms of $Fe_2O_3$ to a content of total iron in terms of $Fe_2O_3$, when an internal transmittance is measured for an optical length of 600 mm within the glass, a minimum of the internal transmittance of the glass within a wavelength range of from 400 to 700 nm is at least 75%, and the content of NiO is a content in which an A value of an internal transmittance spectrum flatness of the glass defined by formula (1) is larger than an A value of a reference glass which has the same composition as the glass except that the reference glass comprises no NiO:

$$A=\min(X,Y,Z)/\max(X,Y,Z) \quad (1)$$

wherein $X=\Sigma(S(\lambda)\times x(\lambda))$, $Y=\Sigma(S(\lambda)\times y(\lambda))$ and $Z=\Sigma(S(\lambda)\times z(\lambda))$, provided that x (λ), y (λ) and z (κ) are color matching functions in the XYZ color system described in JIS Z8701, and S (λ) is the internal transmittance.

2. The light guide according to claim 1, wherein a matrix composition of the glass, which excludes the total iron oxide in terms of $Fe_2O_3$, NiO, $CeO_2$ and other trace components, a content of each of the other trace components being at most 1,000 ppm, comprises, by mass percentage on an oxide basis, substantially from 60 to 80% of $SiO_2$, from 0 to 7% of $Al_2O_3$, from 0 to 10% of MgO, from 0 to 20% of CaO, from 0 to 15% of SrO, from 0 to 15% of BaO, from 3 to 20% of $Na_2O$, and from 0 to 10% of $K_2O$.

3. The light guide according to claim 1, wherein a matrix composition of the glass, which excludes the total iron oxide in terms of $Fe_2O_3$, NiO, $CeO_2$ and other trace components, a content of each of the other trace components being at most 1,000 ppm, comprises, by mass percentage on an oxide basis, substantially from 45 to 80% of $SiO_2$, more than 7% and at most 30% of $Al_2O_3$, from 0 to 15% of $B_2O_3$, from 0 to 15% of MgO, from 0 to 6% of CaO, from 0 to 5% of SrO, from 0 to 5% of BaO, from 7 to 20% of $Na_2O$, from 0 to 10% of $K_2O$, and from 0 to 10% of $ZrO_2$.

4. The light guide according to claim 1, wherein a matrix composition of the glass, which excludes the total iron oxide in terms of $Fe_2O_3$, NiO, $CeO_2$ and other trace components, a content of each of the other trace components being at most 1,000 ppm, comprises, by mass percentage on an oxide basis, substantially from 45 to 70% of $SiO_2$, from 10 to 30% of $Al_2O_3$, from 0 to 15% of $B_2O_3$, from 5 to 30% in total of at least one alkaline earth metal oxide selected from the group consisting of MgO, CaO, SrO and BaO, and from 0% to less than 3% in total of at least one alkali metal oxide selected from the group consisting of $Li_2O$, $Na_2O$, and $K_2O$.

5. The light guide according to claim 1, wherein a content of NiO by mass ppm on an oxide basis in the glass is within a range between a lower limit of NiO and an upper limit of NiO, each defined by formulae (7) and (8):

$$\text{Lower limit of NiO}=-2.7-0.035F+0.01R+0.0025FR \quad (7)$$

$$\text{Upper limit of NiO}=2.4-0.055F+0.01R+0.002FR \quad (8)$$

wherein F (mass ppm) is the content of total iron in terms of $Fe_2O_3$, and R (%) is the redox of iron.

6. The light guide according to claim 1, wherein the glass satisfies formula (9):

$$0.1 \leq [NiO]+2[Cr_2O_3] \leq 5.0 \quad (9)$$

wherein [NiO] (mass ppm) is a content of NiO on an oxide basis in the glass, and [$Cr_2O_3$] (mass ppm) is a content of $Cr_2O_3$ on an oxide basis in the glass.

7. The light guide according to claim 1, wherein a content of $Cr_2O_3$ in the glass is at most 5 ppm by mass ppm on an oxide basis.

8. The light guide according to claim 1, wherein a content of $Cr_2O_3$ in the glass is at most 1.0 ppm by mass ppm on an oxide basis.

9. The light guide according to claim 1, wherein a content of $MnO_2$ in the glass is at most 50 ppm by mass ppm on an oxide basis.

10. The light guide according to claim 1, wherein a content of $MnO_2$ in the glass is at most 10 ppm by mass ppm on an oxide basis.

11. The light guide according to claim 1, wherein a content of $CeO_2$ in the glass is at most 1,000 ppm by mass ppm on an oxide basis.

12. The light guide according to claim 1, wherein the content of NiO in the glass is from 0.01 ppm to 0.2 ppm by mass on an oxide basis.

13. The light guide according to claim 12, wherein a content of $Cr_2O_3$ in the glass is at most 1.0 ppm by mass ppm on an oxide basis.

14. The light guide according to claim 13, wherein the content of total iron oxide in terms of $Fe_2O_3$ in the glass is at most 20 ppm by mass on an oxide basis.

15. The light guide according to claim 14, wherein a content of $Cr_2O_3$ in the glass is at most 0.2 ppm by mass on an oxide basis.

16. The light guide according to claim 15, wherein the glass comprises no $CeO_2$.

17. The light guide according to claim 13, wherein the minimum of the internal transmittance of the glass within a wavelength range of from 400 to 700 nm is at least 86%.

18. The light guide according to claim 17, wherein the A value of the glass is at least 0.90.

19. The light guide according to claim 17, wherein the A value of the glass is at least 0.95.

20. The light guide according to claim 1, wherein a thickness of the plate of the glass is from 0.2 mm to 5 mm.

* * * * *